United States Patent [19]

Hicks et al.

[11] Patent Number: 5,069,851

[45] Date of Patent: Dec. 3, 1991

[54] ABS/ACRYLIC LAMINATION PROCESS

[75] Inventors: Clark T. Hicks, Campbell County, Ky.; Ray D. Hoffman, Westmoreland County; James E. Thompson, II, Plum Borough, both of Pa.

[73] Assignee: Aristech Chemical Corporation, Pittsburgh, Pa.

[21] Appl. No.: 549,874

[22] Filed: Jul. 9, 1990

[51] Int. Cl.$^5$ .............................................. B29C 47/90
[52] U.S. Cl. ................................. 264/171; 156/244.11; 156/500; 264/176.1; 264/211.18; 264/280; 425/113
[58] Field of Search ...................... 264/171, 176.1, 280, 264/175, 510, 516, 211.18; 425/114, 113; 156/244.11, 331.6, 500

[56] References Cited

U.S. PATENT DOCUMENTS

| | | | |
|---|---|---|---|
| Re. 25,200 | 7/1962 | Robinson et al. | 156/244 |
| 2,801,936 | 8/1957 | Bjorksten et al. | 117/138.8 |
| 2,815,308 | 12/1957 | Robinson et al. | 154/102 |
| 3,356,560 | 12/1967 | Callum | 161/5 |
| 3,447,997 | 6/1969 | Kamal | 161/165 |
| 3,451,876 | 6/1969 | Edelmann et al. | 264/171 |
| 3,481,818 | 12/1969 | Wellen | 161/2 |
| 3,654,069 | 4/1972 | Freudenberg | 156/331.6 |
| 4,066,820 | 1/1978 | Kelly et al. | 428/483 |
| 4,076,570 | 2/1978 | Medley et al. | 156/244.11 |
| 4,076,895 | 2/1978 | Theno | 156/244.11 |
| 4,100,237 | 7/1978 | Wiley | 264/40.6 |
| 4,100,325 | 7/1978 | Summers et al. | 428/334 |
| 4,101,702 | 7/1978 | Churchill et al. | 264/171 |
| 4,221,836 | 9/1980 | Rutledge et al. | 264/171 |
| 4,302,497 | 11/1981 | Toyooka et al. | 428/203 |
| 4,415,519 | 11/1983 | Strassel | 264/171 |
| 4,477,521 | 10/1984 | Lehmann et al. | 156/244.11 |
| 4,868,058 | 9/1989 | Biglione et al. | 264/176.1 |

*Primary Examiner*—Jeffery Thurlow
*Attorney, Agent, or Firm*—William L. Krayer

[57] ABSTRACT

Continuous lamination of ABS and polymethylmethacrylate (PMMA) is achieved employing a continuous sheet or reel of PMMA 0.1 inch to 0.250 inch thick optionally preheated on one side; a web of ABS is extruded at about 450°–550° F. from pellets onto the PMMA at the nip of a roll stack. In the roll stack, the two laminated layers are compressed and gradually cooled. The laminate displays properties of both ABS and acrylic. It has excellent thermoforming properties.

8 Claims, 1 Drawing Sheet

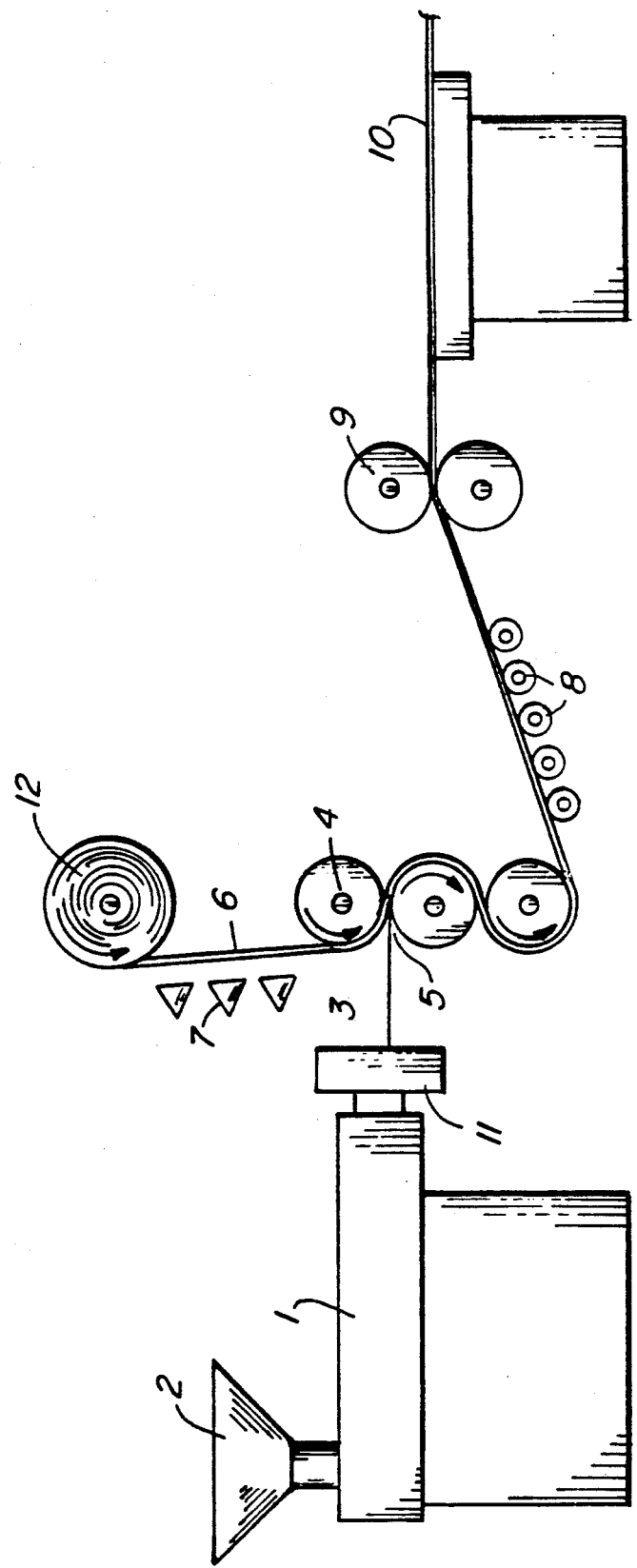

ABS/ACRYLIC LAMINATION PROCESS

TECHNICAL FIELD

This invention relates to the manufacture of laminated formable materials of acrylonitrile-butadiene-styrene (ABS) and cross-linked polymethylmethacrylate ("XPMMA"). The laminated product made by the new process exhibits excellent impact resistance properties as compared to polymethylmethacrylate (PMMA) alone, or XPMMA, while preserving the excellent appearance and thermoforming properties of PMMA as well as exhibiting excellent bonding of the two layers.

BACKGROUND OF THE INVENTION

Polymethylmethacrylate sheet is widely used in thermoforming applications such as for shower/tub enclosures, outdoor signs, and the like. Such thermoforming applications require the use of large molds frequently having deep drawn areas and/or corners which bring about variations in thickness, sometimes causing a weakening of the material in areas where strength is needed. The thermoformable sheet must be easily molded and retain a good measure of strength after molding. The acrylic sheet commonly used has a high luster as well and can accommodate a wide variety of pigments, fillers, dyes, and the like. It may also contain impact modifying particles, and/or may be cross-linked for toughness. Cross-linked materials typically are made by casting rather than extrusion.

Reinforcement, in the form of unsaturated polyester resins, applied usually with glass fibers to the back of the formed acrylic sheet, is frequently necessary to guard against mechanical failures of molded articles such as shower/tub enclosures and hot tubs. The application of the fiberglass reinforced polyester resin to the individual formed product is labor-intensive and generally undesirable because of its non-uniformity and the emission of styrene during application. The art, accordingly, is in need of a strong formable acrylic sheet having a built-in reinforcement.

A review of prior patents reveals that various acrylic coatings have been applied to polystyrene substrates by the use of solvents (U.S. Pat. No. 2,801,936). In U.S. Pat. No. 2,788,051, a layer of thermosetting polymer is extruded onto a substrate. Aqueous acrylic materials are coated onto various bases including acrylic sheets in U.S. Pat. Nos. 4,066,820 and 4,202,924. Various laminated sheets and methods of making them, are disclosed in U.S. Pat. Nos. 4,717,624, 4,699,579, and 4,419,412; U.S. Pat. Nos. 4,100,325 and 4,221,836 include ABS as a component. Co-extrusion of ABS and polystyrene is shown in U.S. Pat. No. 4,100,237, and co-extrusion of two different acrylic compositions is shown in U.S. Pat. No. 3,846,368. Some of the prior art approaches to lamination involve an intermediate adhesive material, which is not necessary in applicant's process. See the complicated layering in U.S. Pat. No. 3,356,560 which involves separated layers of PMMA and a material similar to it.

J. E. Johnson, in "Co-extrusion" *Plastics Technology*, February, 1976, states ABS and acrylic may see wide-ranging sheet applications, largely in outdoor furniture. He states they can be readily co-extruded, and doing so combines the toughness of ABS with the weatherability of acrylic.

One of the inventors herein is aware of the commercial use of a process in about 1970 wherein a thin polyacrylate film was applied, to a substrate of a preformed ABS sheet, heated on only one side after which heat and pressure were applied in a roll stack.

The present process differs from the 1970 process in that the ABS is heated to a higher temperature and in fact is a pliant "web" emerging directly from an extruder where it is made from pellets or the like. The ABS is not only at a higher temperature, but is heated throughout rather than only on one side, thus enabling it to respond more completely to the compression environment of the roll stack, with the advantages which will be explained infra. The acrylic of the present process, being thicker than that of the 1970 process, serves as a base or substrate for the ABS. The ABS is in a more plastic state than the ABS of the prior art process, which was employed as the substrate for the acrylic film.

SUMMARY OF THE INVENTION

The present invention is a particular way of continuously manufacturing a dual-layer thermoformable sheet of ABS and PMMA. The essential steps of the process are (a) passing an acrylic sheet of the type defined further herein optionally through a heating zone where it is heated to a temperature up to about 350° F., preferably about 280° F. to about 350° F., (b) feeding the acrylic sheet into a roll stack, (c) co-feeding into the roll stack an ABS melt sheet, or web, from an extruder, (d) cooling and compressing the co-fed sheets between rolls under compression, and (e) cooling said sheet.

By a "continuous" process we mean a process involving an acrylic sheet longer than ten feet or so. Our process ideally involves the use of acrylic sheet which is in the form of large rolls of 400 to 600 feet even though the sheet may be as thick as 0.250". Our process employs acrylic sheet about 0.10" to about 0.250" thick and about 36" to about 110" wide, in lengths of at least 400 feet. Such lengths may be made in the manner described in U.S. Pat. Nos. 3,371,383 and 3,376,371 to Hellsund and Opel et al, respectively. The sheet may be taken off the machine described and placed in large rolls for use in our process. More particularly, the acrylic sheet will be made of cross-linked polymethylmethacrylate, having about 0.1% to about 0.3% of a cross-linking monomer selected from ethylene glycol dimethacrylate, polyethylene dimethacrylate, butane, hexane and/or higher dimethacrylate, i.e., any dimethacrylate having a linking group of up to about ten carbon atoms, and in which about 10 to about 20% of the polymethylmethacrylate is not cross-linked.

We have found that the predominantly cross-linked PMMA described in the preceding paragraph is particularly good for our purposes because it is tough and will provide a swell index of about 10 to about 15. The uncross-linked portion, comprising about 10% to about 20% of the sheet, helps to facilitate the penetration of the acrylic sheet by the styrene-acrylonitrile (SAN) of the ABS, since the SAN and the uncrosslinked PMMA are miscible.

The ABS may be any of the acrylonitrile-butadiene-styrene materials commonly found in commerce, used in a form which is conveniently extruded to the same width as the width of the acrylic. As is recited in U.S. Pat. No. 4,100,325 (col. 6, lines 48–68):

Acrylonitrile-butadiene-styrene (ABS) polymers are suitable for use as the substrates of this invention. As is well known, ABS resins are polymeric materials made from acrylonitrile, butadiene, and styrene. Some ABS resins are made by polymerizing all three ingredients together. Others are made by block polymerization involving different ones or different mixtures of the three materials in different stages. Still others are made by polymerizing different pairs of these three materials and then blending the copolymers to produce a resin blend containing all three materials. ABS materials suitable for use as substrates in this invention contain from about 15% to about 35% acrylonitrile, from about 10% to about 35% butadiene, and from about 45% to about 65% styrene. Preferably, said materials contain from about 18% to about 24% acrylonitrile, from about 27% to 33% butadiene, and from about 46% to about 52% styrene.

The ABS substrates of this invention may contain other ingredients such as fillers, stabilizers, antioxidants, colorants, and others.

ABS generally comprises discrete rubber particles which may be made by grafting or copolymerizing styrene-acrylonitrile copolymer onto a polybutadiene backbone, or by grafting or copolymerizing acrylonitrile onto or with butadiene, or simply butadiene. This rubbery material is dispersed in a continuous matrix of styrene-acrylonitrile (SAN) copolymer, as is well known in the art. Useful compositions within the general category of ABS are commercially designated 841 and 1152 made by Monsanto. Most conveniently, the ABS is used in pellet form. We may use any commercially available ABS, which typically will have an SAN matrix comprising about 65 to about 90% by weight of the ABS, and the balance a rubbery material dispersed therein.

By an "ABS web", we mean a wide ribbon of heated ABS which is in a plastic state, normally in a range of temperatures about 450° F. to about 550° F., made in an extruder directly from pellets or other particulates. The web may droop somewhat in passing to the roll stack but will generally retain its shape. It is essential that the ABS be at least 450° F. in order to assure the interpenetration with the acrylic which is required for good lamination.

Our laminated sheet will generally be designed so the acrylic will be visible and on the normally used surface (as in a molded shower-tub enclosure, for example), and the ABS provides reinforcement and back-up. The cross-linked acrylic, typically made by casting on machines described in the aforementioned Hellsund and Opel patents generally has a "fine china" sheen, and is harder and more stain and chemical resistant than extruded acrylic sheet. We do not intend to use extruded acrylic, which is generally not cross-linked.

BRIEF DESCRIPTION OF THE DRAWING

The drawing is a more or less diagrammatic side elevational view of a sheet/extrusion line preferred in our invention.

DETAILED DESCRIPTION OF THE INVENTION

Our invention will be described in further detail with reference to FIG. 1. FIG. 1 is a more or less diagrammatic illustration of a sheet/extrusion line useful in our invention. The extruder 1 receives ABS pellets in hopper 2, and feeds a web 3 of molten or plasticized ABS (typically 490° F.) which emerges from a die 11 to a stack 4 of metal rolls. Just prior to entry into the nip 5 of the roll stack 4, acrylic sheet 6 from feed roll 12, optionally preheated to about 300° F. by radiant heaters 7, is laid on the hot web 3 of ABS. Both the ABS web 3 and the preheated acrylic sheet 6 are typically about 101 inches wide at nip 5 and about 99 inches wide at shear point 10, due to thermal shrinkage.

The initial width may be up to about 130 inches. The roll stack 4 should be provided with internal cooling means such as circulated water, and ideally will be controlled successively at about 260° F., 220° F., and 200° F. At the exit of pull roll 9, the temperature should be about 150° F. on the acrylic surface; the ABS may still be about 220° F. In addition to cooling, the rolls preferably provide approximately 540 lb./lineal inch (500 to 580) of pressure to firmly bond the two materials. The combined sheet then cools further in air while supported on cooling/support rolls 8, is drawn through the pull rolls 9, and is optionally cut to size at shear point 10. It will be noted that the acrylic sheet 6 need be heated only from one side if at all, and that the initial ABS cooling is in direct contact with the roll 13. On roll 14, the ABS, which is initially considerably warmer than the acrylic, is cooled indirectly through the acrylic, which of course absorbs heat from the ABS.

Materials used in a particular demonstration of the invention were 150 mil, "I-300" (lightly cross-linked) acrylic, a commercially available product of Aristech Chemical Corporation, and Cycolac GSE ABS resin from G.E. Plastics. The hygroscopic ABS pellets were first dried in a desiccant dryer to remove moisture. For these demonstrations, 16-inch square specimens were cut from the acrylic roll, preheated in an oven to 300° F., and placed on 130 mils of molten ABS. Clearance between cooling rolls was set at 270 mil, and a roll temperature of 212° F. was maintained on all three rolls.

Using the above procedure, several 280-mil acrylic-/ABS laminates were made. The materials bonded successfully without the use of an adhesive. Samples thermoformed at 360° F. maintained good adhesion.

The excellent bonding between lightly cross-linked PMMA and ABS is primarily due to the diffusion of styrene-acrylonitrile copolymers (SAN) in the ABS into the acrylic layer (because 80-90% of the acrylic is cross-linked, only the acrylic extractables, about 10%-20%, can diffuse into the ABS). This diffusion is enhanced because ABS and PMMA are miscible if the acrylonitrile content of the SAN is between about 10% and about 33%. See e.g., M. E. Fowler, J. W. Barlow, and D. R. Paul "Kinetics of Adhesion Development at PMMA-SAN Interfaces", Polymer, Vol. 28, (1987), pp. 2145-2150.

The interfacial layer may be as thick as 50 nanometers, depending on the amount of cross-linking and the time and temperature of conditions within our process, based on an equation for average interpenetration depth given in Zhang and Wool, Macromolecules, Vol. 22 (No. 7), 1989, p. 3020, and assuming a diffusion coefficient for the polymer of $1 \times 10^{-12}$ cm$^2$/sec. Total compression time is about 2.5 minutes, the turning of the rolls providing a laminate velocity of about 18 inches per minute. Throughout the applied range of temperatures the effect of compression pressure and duration of compression can be seen. The strength of the bond is a function of the 0.25 power of contact time. If the desired combined thickness is, for example 0.35 inch, the first roll space should be about 0.340 inch.

Table I compares the results from Dynatup impact testing of the extrusion laminates to results on DR acrylic/ABS and Rovel/ABS co-extruded laminates, as well as monolithic samples of I-300 lightly cross-linked acrylic, and ABS. As noted, the first material listed for the laminates indicates the impacted side, and the failure energy reported is for that layer. The I-300/ABS composite yielded an impact resistance superior to monolithic I-300 acrylic (significant to the 95% confidence level). The DR/ABS and Rovel/ABS were an order of magnitude higher in impact energy. Lap-shear strength tests showed that the bonded area was stronger than either the ABS or acrylic.

Inspection of the impacted specimens reveals interesting differences in the mode of failure between the samples. The I-300 shattered typically like acrylic. Monolithic ABS, DR/ABS, and Rovel/ABS failed by the impactor driving straight through the thickness with damage confined to a hole of the circumference of the impactor.

The samples produced by our process, however, had a completely different mode of failure. For these, a hole developed in the acrylic which again was about the same diameter of the impactor. The backup layer appears to prevent the rapid propagation of cracks normally prevalent in acrylic impact behavior. On the ABS side, a larger puncture (approximately twice the size of the top hole) formed. The undamaged area of all laminate specimens remained tightly bonded. Therefore our process eliminates the need for impact modifier additives because the ABS imparts its impact properties to the acrylic.

Compressive lap-shear properties of the laminate of the present invention were also tested. The bond strength apparently exceeded the inherent strength of the ABS since in all cases the ABS failed before the laminated surfaces.

The PMMA is in the form of sheet and made by polymerizing a mixture of monomers comprising methylmethacrylate with up to about 8% by weight other acrylate esters (such as butyl acrylate) and about 0.1% by weight to about 0.3% by weight cross-linking monomer which may include discrete particles of "impact modifier" as is known in the art; however, such impact modifiers are not necessary. The acrylic sheet is about 0.1 to about 0.25 inch, conveniently, from about 0.1 inch to about 0.187 inch thick, most preferably about 0.108 to about 0.140 inch.

The ABS should be about 0.1 inch to about 0.4 inch thick.

The orientation of the roll stack, of course, need not be as shown in FIG. 1—that is, the lamination process can take place horizontally or the sheets can be made to travel up rather than down.

TABLE I

| | Dynatup Impact Results | |
|---|---|---|
| Material* | Thickness, inch | Failure Energy, (ft.-lb.)** |
| I-300 | 0.362 | 2.72 |
| ABS | 0.261 | 70.7 |
| DR/ABS | 0.067/0.287 | 36.6 |
| Rovel/ABS | 0.075/0.275 | 23.8 |
| I-300/ABS | 0.150/0.130 | 5.29 |

*The first material listed indicates the side which was impacted.
**Failure energy for the impacted layer.

We claim:

1. Method of making an ABS acrylic laminate comprising (a) passing a lightly cross-linked acrylic sheet having a thickness about 0.1 inch to about 0.250 inch into a roll stack, (b) co-feeding into the roll stack an ABS web about 0.1 to about 0.4 inch thick heated to about 450° F. to about 550° F., wherein the acrylonitrile content of the styrene-acrylonitrile component is about 10% to about 33% by weight, from an extruder to achieve intimate contact between the ABS and the acrylic sheet, and (c) cooling and compressing the co-fed sheets between rolls under compression.

2. Method of claim 1 wherein an interfacial layer is formed between the ABS and acrylic, said interfacial layer being partially due to migration of styrene-acrylonitrile polymer migrating into the acrylic sheet and partially due to migration of polymethylmethacrylate into the ABS.

3. Method of claim 1 wherein the acrylic sheet is heated on one side to about 300°-350° F. prior to passing into the roll stack.

4. Method of claim 1 wherein the lightly cross-linked acrylic sheet comprises polymethylmethacrylate having about 0.1% to about 0.3% by weight cross-linking monomers.

5. Method of claim 4 wherein the cross-linking monomer is a dimethacrylate.

6. Method of claim 1 in which about 10% to about 20% by weight of the polymethylmethacrylate is not cross-linked.

7. Method of claim 1 wherein the acrylic sheet has a swell index of about 10 to about 15.

8. Method of claim 1 wherein the temperatures of the rolls are successively controlled from about 260° F. to about 200° F.

* * * * *